United States Patent
Bahr

(10) Patent No.: US 8,223,658 B2
(45) Date of Patent: Jul. 17, 2012

(54) METHOD FOR OPERATING A MESH-TYPE NETWORK, PARTICULARLY AS DEFINED IN AN IEEE 802.11S STANDARD, FORMED BY A PLURALITY OF NETWORK NODES

(75) Inventor: Michael Bahr, Munich (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 274 days.

(21) Appl. No.: 12/595,086

(22) PCT Filed: Apr. 10, 2008

(86) PCT No.: PCT/EP2008/054379
§ 371 (c)(1),
(2), (4) Date: Dec. 16, 2009

(87) PCT Pub. No.: WO2008/122674
PCT Pub. Date: Oct. 16, 2008

(65) Prior Publication Data
US 2011/0194415 A1     Aug. 11, 2011

(30) Foreign Application Priority Data

Apr. 10, 2007   (DE) .......................... 10 2007 016 889

(51) Int. Cl.
*H04J 1/16* (2006.01)
(52) U.S. Cl. .................. 370/242; 370/351; 370/389
(58) Field of Classification Search .................. 370/229, 370/230, 242, 252, 254, 255, 256, 312, 329, 370/338, 349, 351, 392, 389, 311, 400, 401, 406; 709/224, 242; 455/422.1
See application file for complete search history.

(56) References Cited

U.S. PATENT DOCUMENTS

| | | | |
|---|---|---|---|
| 7,710,934 B2 * | 5/2010 | Cho et al. ........................ | 370/338 |
| 2007/0110024 A1 * | 5/2007 | Meier ............................. | 370/351 |
| 2007/0165592 A1 * | 7/2007 | Gossain et al. ................ | 370/349 |
| 2007/0189192 A1 * | 8/2007 | Kim ................................ | 370/255 |
| 2007/0266143 A1 * | 11/2007 | Zeng et al. ..................... | 709/224 |
| 2008/0170550 A1 * | 7/2008 | Liu et al. ........................ | 370/338 |

OTHER PUBLICATIONS

Joint SEE-Mesh/WI-Mesh Proposal to 802.11 TGs, Feb. 2006, pp. 1-165.*

* cited by examiner

*Primary Examiner* — Chi Pham
*Assistant Examiner* — Abdullah Riyami
(74) *Attorney, Agent, or Firm* — Buchanan Ingersoll & Rooney PC

(57) ABSTRACT

Embodiments of the invention relates to a method for operating a mesh-type network, particularly as defined in an IEEE 802.11s standard, formed by a plurality of network nodes, said network operating at least a first network node that functions as access point for stations which are dissociated from the network and a second network node that functions as connector point for stations that are dissociated from the network. When switching a dissociated station from a radio service area of the first network node to the radio service area of the second network node in said mesh network, an updating of allocation information of nodes based on a route error message which is defined according to a routing protocol valid for the mesh network is carried out.

20 Claims, 13 Drawing Sheets

PRIOR ART

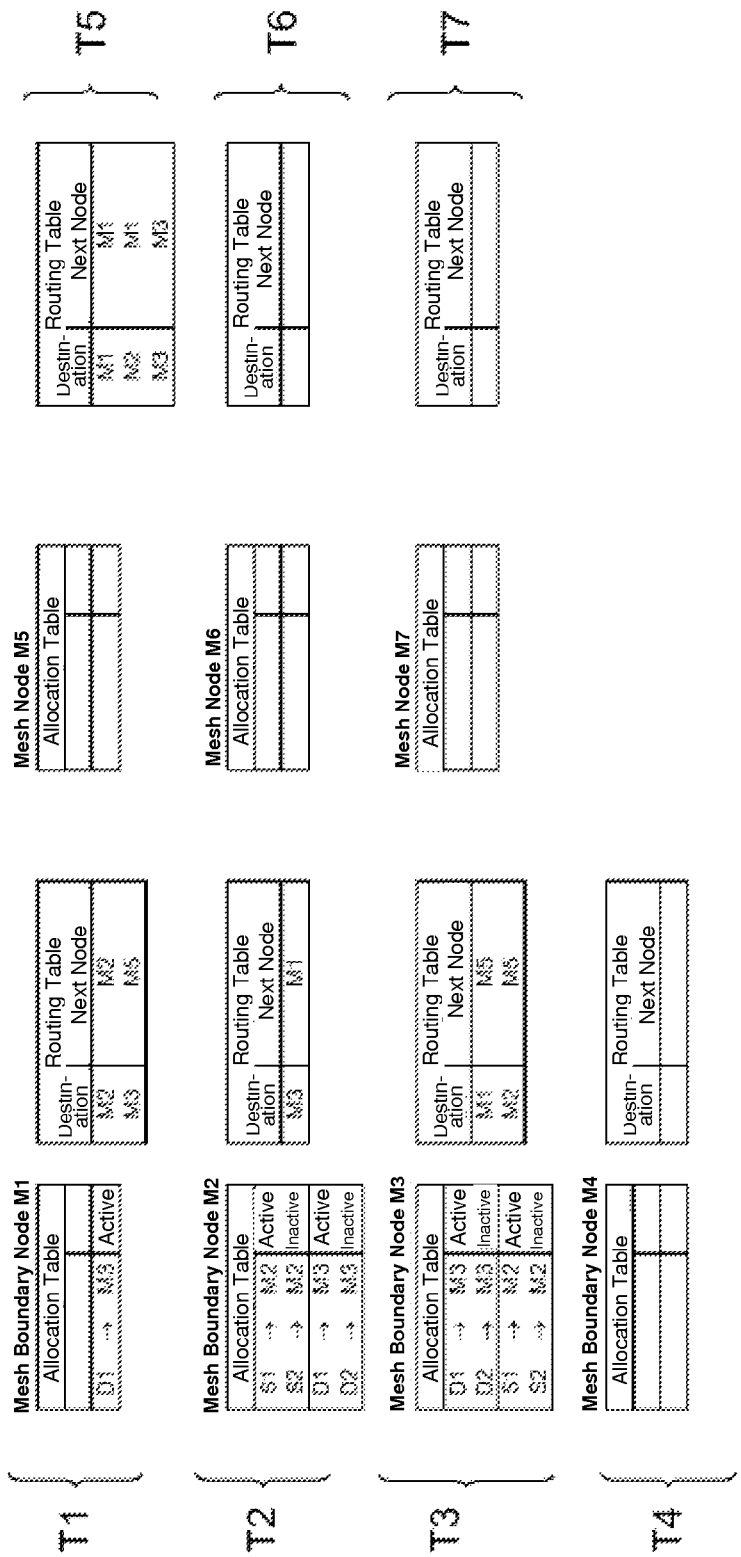

METHOD FOR OPERATING A MESH-TYPE NETWORK, PARTICULARLY AS DEFINED IN AN IEEE 802.11S STANDARD, FORMED BY A PLURALITY OF NETWORK NODES

CROSS-REFERENCE TO RELATED APPLICATIONS

This application is the United States national phase under 35 U.S.C. §371 of PCT International Application No. PCT/EP2008/054379, filed on Apr. 10, 2008, and claiming priority to German Application No. 10 2007 016 889.8, filed on Apr. 10, 2007.

BACKGROUND OF THE INVENTION

1. Field of the Invention

The invention relates to the operation of a mesh-type network, particularly as defined in IEEE standard 802.11s, formed by a plurality of network nodes.

2. Background of the Related Art

It is known that IEEE standard 802.11s for WLAN mesh networks, which is in the process of being developed (see IEEE P802.11s™/D1.01 Draft STANDARD for Information Technology-Telecommunications and information exchange between systems-Local and metropolitan area networks-Specific Requirements-Part 11: Wireless LAN Medium Access Control (MAC) and Physical Layer (PHY) specifications: Amendment: ESS Mesh Networking), uses 6 addresses in the data packets. In this case, as FIG. 1 shows, the $5^{th}$ and $6^{th}$ addresses are used to store the MAC addresses of source and destination nodes that are outside the WLAN mesh network.

In this connection, methods were proposed, as in the case of a path calculation in the standard routing protocol of IEEE 802.11s, "Hybrid Wireless Mesh Protocol (HWMP)," which can impart a connection between external nodes, i.e., network nodes that are not mesh nodes and are therefore located outside the mesh network, and the corresponding mesh boundary nodes to which these external nodes are adjacent. However, these methods are only suitable for long-lasting mappings (allocations) between the external nodes and the mesh boundary nodes. In particular, mobility of stations STA that are connected to mesh access points MAP and can switch from one mesh access point to the next, as indicated in FIG. 2 by the mobile station STA at the mesh access points MAP, is supported only inadequately.

The proposed "Radio-aware Optimized Link State Routing (RA-OLSR)" protocol, which is an optional, proactive routing protocol of IEEE standard 802.11s [1, Section 11A.7], uses a proactive mechanism to announce all allocations between stations and mesh access points to all other mesh nodes. Every mesh access point has a local database known as a local association base (LAB), which contains all stations associated with this mesh access point. The content of this local database is periodically sent to all nodes in the mesh network by means of a so-called local association base announcement (LABA) message. Said nodes store the data from the received messages in their so-called global association base (GAB) global data and thereby know to which mesh access point they must forward data packets that are targeted to specific stations.

If a station switches from one mesh access point to another, then, at the latest with the next periodic LABA message, the changes will be announced in the RA-OLSR mesh network. Referring to the depiction in FIG. 2, this means that the LABA message of the old mesh access point of the mobile station no longer contains the address of the mobile station and that the LABA message of the new mesh access point of the mobile station now contains the address of the mobile station.

BRIEF SUMMARY OF THE INVENTION

In the case of the invented method for operating a mesh-type network, in particular as defined in IEEE standard 802.11s, formed by a plurality of network nodes, said network operating at least a first network node that functions as access point for stations which are dissociated from the network and at least a second network node that functions as connector point for stations that are dissociated from the network, when switching a dissociated station from a radio service area of the first network node to the radio service area of the second network node in said mesh network, the allocation information of nodes is updated based on a routing failure message which is defined according to a routing protocol that is valid for the mesh network.

An essential advantage of the invention is that even short-lived mappings or allocations of mesh-network-external to mesh-network-internal network nodes can be conveyed promptly. As a result, the invented method is especially suitable for an environment in which mobile mesh-network-external stations of a connector point, for example a mesh boundary node which, as a mesh portal, has a connection to another communication network or a mesh access point that permits mesh-external stations to communicate with the mesh network, can move to the next connector point. Moreover, the invented method is suitable for a mesh-network environment in which mobile stations do not receive a new address allocation in the case of an access point change.

The invention is preferably further developed in that an access table allocated to a mesh network node is structured such that it is divided into a first subarea and a second subarea, wherein the first subarea contains at least one piece of information for all allocations of the mesh node with which the allocation table is associated, and the second subarea contains at least once piece of information for allocations known to it from other mesh nodes of the mesh network, and the first and/or second subarea has an allocation characteristic structured in particular as a table column, which contains information reflecting the activity status.

An advantageous further development of the invention consists of the routing error message being structured such that information embodied in particular at least as a so-called flag can be included so that erroneous allocation information can be signaled.

According to another development of this invented approach, the structured routing error message is only based on manipulations of the second table area.

The structured routing error message is sent by all mesh nodes, which have a path to a mesh node functioning as connector point and indicated in the routing error message, by means of broadcast, wherein all allocation information to which the sending mesh node does not have a path is deleted from the structured routing error message prior to the broadcast.

Alternatively, the structured routing error message can be sent by means of unicast from all mesh nodes to all neighboring mesh nodes.

Another advantageous further development of this consists of the activity status information of the allocation table of the mesh network node reflecting an "active" status, when a data packet arrives at the mesh network node, with the data packet signaling a dissociated node as either source or destination. This allows prompt adaptation of the allocation status.

Another advantageous further development consists of the allocation information being supplemented with information about a first validity period structured in particular as a column, wherein, when setting the activity status information to a status of "active", the value of the first validity period is entered and wherein, when the first validity period expires, the activity status information is set to a status of "inactive". This allows prompt and guaranteed up-to-date adaptation of the allocation status.

In another further development of the invention, a message on the part of the exited first network node is structured in such a way and sent by means of broadcast such that it contains all allocation information identified as "active" from the second table area of the first network node.

This is advantageously further developed in that the number of times the message is forwarded to other nodes is established in particular by a so-called "time-to-live" so that the message is not distributed unnecessarily to the entire mesh network, in particular if it is large, but rather it is ensured that only affected mesh network nodes are notified.

This is advantageously further developed in that the value of the validity period is determined in such a way that it correlates to a validity period of a path, to which the updates made for the involved nodes relate. The determination is carried out in particular on the basis of path-forming protocol messages according to the protocol valid for the mesh network.

In another further development of the invention, at least the activity status information of the first table area is preferably updated on the basis of events initiated by the access procedures prescribed for the dissociated station. This supports the connection to the mesh network of dissociated stations that are not functioning according to the mesh.

Another further development of the invention provides that at least the activity information of the second table area is updated on the basis of events initiated by procedures prescribed for the mesh network, in particular routing procedures. This ensures the accustomed functionality of the mesh network.

In the case of another further development, the received information is discarded by a mesh network node receiving information about allocation information already contained in the first table area. As a result, possible time-related constellation problems as well as addressing problems are intercepted.

In the case of another development of the invention, allocation messages constituted in accordance with the routing protocol valid for the mesh network are structured such that they can be occupied in a targeted manner with values, in particular for an actual remaining validity period for the respective allocation information, in order to determine the first validity period. This supports the updating of allocation information contained in the second table area in particular.

DESCRIPTION OF THE FIGURES

Additional details and advantages of the invention are explained on the basis of FIGS. 3 through 9, starting from the current state of the art detailed in FIGS. 1 through 2. The figures show.

DETAILED DESCRIPTION OF THE INVENTION

Figure 1:
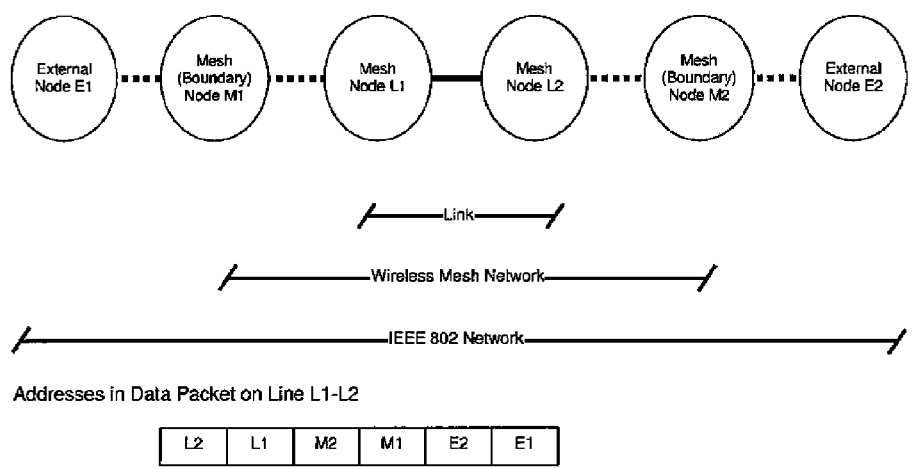
FIG. 1 Six-address scheme as defined in IEEE 802.11s
Figure 2:
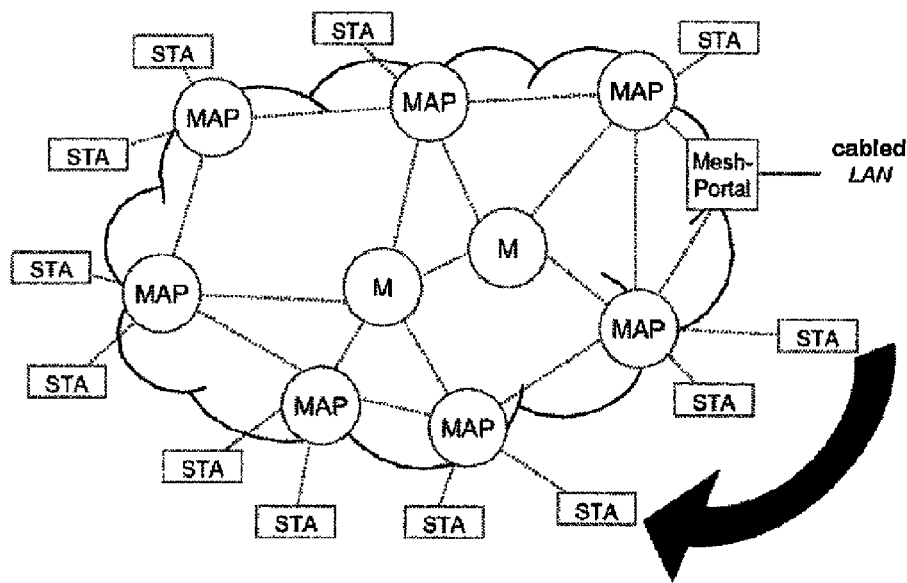
FIG. 2 Wireless mesh network with mobile stations
Figure 3:
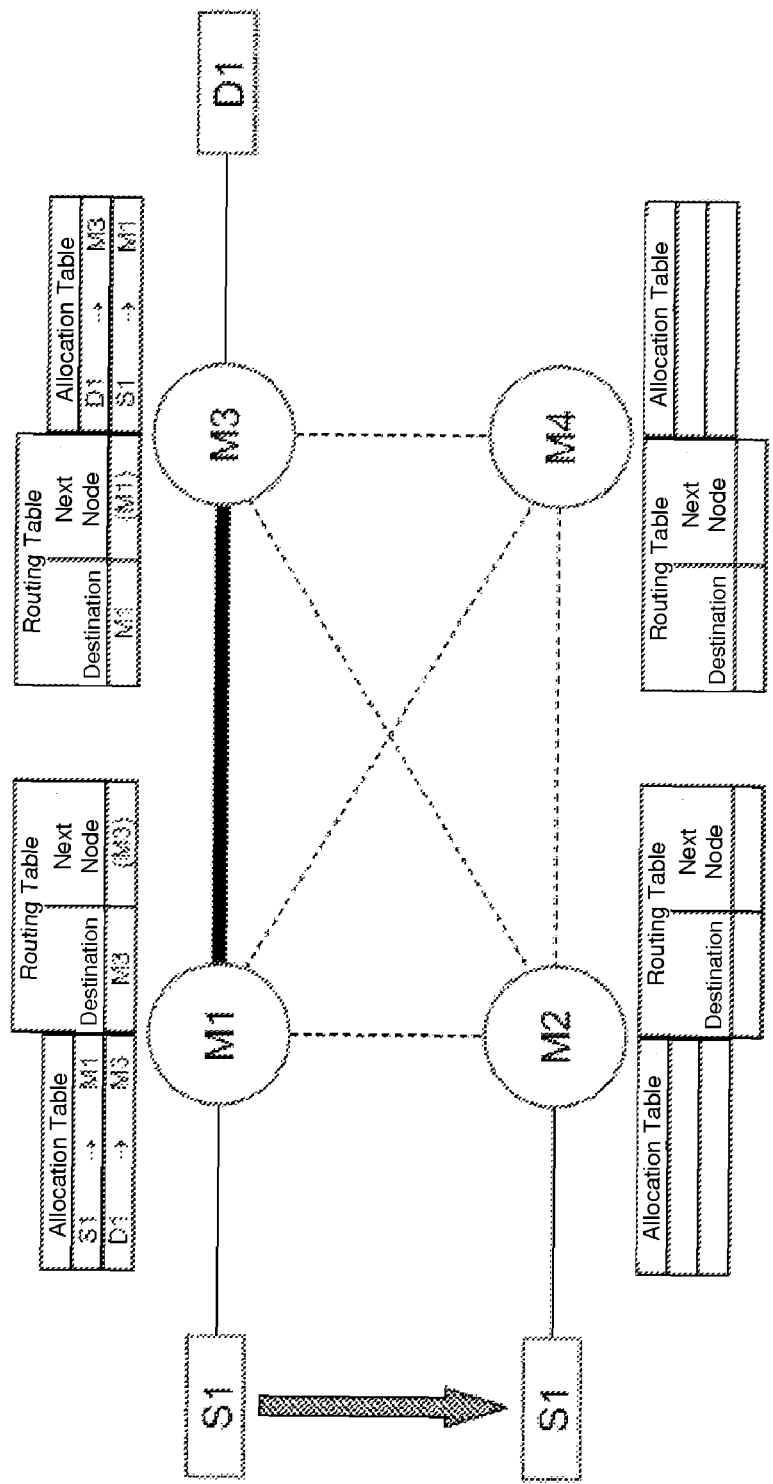
FIG. 3 Application example of a mesh network implementing the invention

FIG. 3 shows an example of a mesh network, which, as an application example of the invention, makes implementation of the invented method possible and is the basis for further explanations of the invention. Only those mesh boundary nodes that are required for the explanation are depicted in this network, i.e., a first mesh boundary node M1, a second mesh boundary node M2, a third mesh boundary node M3, and a fourth mesh boundary node M4. This application example can actually contain many more mesh nodes than depicted. Paths between two depicted mesh boundary nodes can go over several mesh nodes. Likewise, to ensure clarity, only one external source node S1 and one external destination node D1 are indicated and depicted, abridging what is as a rule a plurality of external nodes. Likewise, additional nodes can also be located between them and the corresponding mesh boundary nodes M1-M4.

For the depicted application example, "external nodes" are defined as network nodes that are not mesh nodes and are therefore outside of the mesh network.

Furthermore, "mesh boundary node" designates a mesh node which, along with connections to other mesh nodes, also has a connection to nodes that do not belong to the mesh network. These can be "mesh access points" in the context of IEEE 802.11s, with which normal WLAN stations (user nodes) can be connected in order to communicate via the mesh network, or so-called "mesh portals," which are connected to other networks, such as a cabled Ethernet.

A mesh boundary node, which connects an external source node to the mesh network, is also designated as a mesh source node. A mesh boundary node, which connects an external destination node to the mesh network, is also designated as a mesh destination node.

Conceptually, mesh access points and mesh portals according to the invention and therefore according to this application example can be treated as alike. However, they differ in terms of the way they receive information about nodes outside the mesh that can be reached through them. The topology and the possible number of external nodes that can be reached through them can also vary.

In the context of the application example, "allocation tables" are defined such that they contain allocations between mesh boundary nodes and external nodes. An entry in the allocation table describes via which mesh boundary node the indicated external node can be reached from the mesh network. In the process, the allocation table according to the application example can be divided firstly into a "local part of the allocation table," which contains all allocations of this mesh node, with the mesh node able to reach the external node via an external interface, a so-called "non-mesh interface," and only mesh boundary nodes have a local part, and secondly into a "global part of the allocation table," which contains all known allocations of other mesh nodes, with the mesh node in question able to reach the external node via the indicated mesh boundary node, and every mesh node can have a global part.

Moreover, local and global parts of the allocation table can be implemented as two separate tables or even as a common table. What counts is that every mesh node has an allocation table. The table index of the allocation table is the external node: mesh nodes seek the matching mesh boundary node for a given external node.

Figure 5:
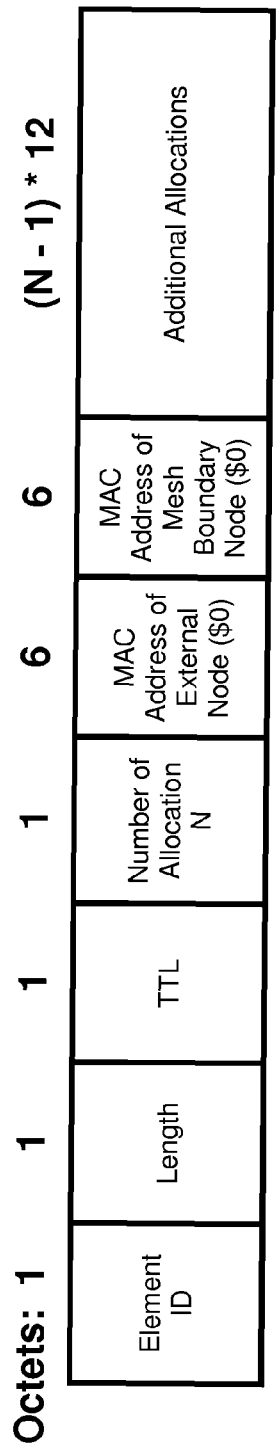
FIG. 5 Allocation message (allocation announcement)

Moreover, it is defined for the application example that "allocation messages" are messages that can announce allocations to other mesh nodes in the mesh network. FIG. 5 describes an application example with this structure and additional details about these types of messages.

A station designed according to IEEE standard 802.11 or its derivatives, which form the basis for the wireless local area network, can be the external source node S1, which according to the depiction can send data packets via the first mesh boundary node M1 data packets to the mesh network, while the first mesh boundary node M1 can act as a mesh access point.

According to the depiction, the external destination node D1 can receive data packets from the mesh network via a third mesh boundary node M3. In a real mesh network, D1 can be, e.g., a node in a cabled Ethernet and M3 can be a mesh portal.

In the mesh network depicted in FIG. 3, there is precisely one path, namely between the first mesh boundary node M1 and the third boundary node M3. This path was established for communication between the external source node S1 and the external destination node D1. Routing tables and allocation tables are also shown in FIG. 3, which are generated or assumed in the example in accordance with the assumptions.

When switching an external node S1, D1 to another mesh boundary node M1-M4, it must be taken into consideration that communication is often bidirectional. According to the example in FIG. 3, this means that the source node S1 is functionally the source node for the (unidirectional) communication directed from the source node S1 to the destination node D1, and the destination node D1 is functionally the destination node, and the source node S1 is functionally the destination node for the (unidirectional) communication from the destination node D1 to the source node S1, and the destination node D1 is functionally the source node.

The structure of the allocation tables according to the application example shown in FIG. 3 as well as definitions in this regard will be explained in greater detail in the following text.

According to the application example, the minimum requirements for the allocation table with regard to the existing columns are that the following types of information are provided as columns:
  Addresses of external nodes (key column)
  Addresses of associated mesh boundary nodes
  Timeout/remaining validity time of the allocation Moreover, according to the invention, the allocation table is expanded by the following column:
  Information type "inactive/active", with the two values
    Inactive: The allocation is currently not being used for forwarding data packets. It may be that no path exists to the corresponding mesh boundary node M1-M4.
    Active: The allocation is being used momentarily for forwarding data packets. A path exists to the corresponding mesh boundary node M1-M4.

If a data packet arrives for or from an external node at the mesh boundary node M1-M4, then the "inactive/active" column of the corresponding entry in the allocation table is assigned in particular a coded value reflecting the "active" information, and the timeout is set to its start value. If the timer runs out, i.e., for a specific period no packet is forwarded from the mesh boundary node to the corresponding external node or received by it, the "inactive/active" column is assigned in particular a coded value reflecting the "inactive" information.

Because the allocations are actually parts of the path, the start value of the timer for an allocation should correspond to the timeout of the associated path in the mesh network. As a result, in the invention the start value of the timer is adopted from the corresponding routing messages: as a rule, the RREQ or RREP message defined according to IEEE 802.11s or, for the start value, the same value as is used for the determined mesh path.

Initializing the "inactive/active" column with a new entry in the allocation table is done differently for the local and global parts according to the application example.

In the local part, the entries are set and deleted via external methods, for example in the case of the IEEE 802.11-defined association and dissociation of an IEEE 802.11 station, i.e., an external node, with a mesh access point. However, a mesh path to this external node is not established by this. As a result, the inactive/active column is initiated as inactive according to the invention.

In the global part, the entries are set by routing messages from the mesh network. Thus there is a corresponding mesh path for a new entry. As a result, according to the invention, the inactive/active column is initialized as active. The mesh path is also set to active so that the corresponding allocation must also be active. The timer for the allocation is started at the same time.

Only in the global part of the allocation table can an inactive allocation also be deleted by the mesh node itself, e.g., in order to keep the allocation table as small as possible. In the local part of the allocation table, allocations are deleted by external methods, e.g., the dissociation of a station from a mesh access point.

In routing protocols like the HWMP, the temporal sequence of the routing messages is ensured as a rule by sequence numbers. These sequence numbers are linked to the originator of the routing messages and make sure that old routing messages with outdated information cannot overwrite the current information. The external nodes are the corresponding originators of allocations. External nodes cannot be expanded and therefore also cannot link any sequence numbers to the allocations.

In a variation of the invented method, the corresponding mesh boundary nodes M1-M4 link a sequence number to the allocations. However, it is then necessary, according to the invention variation, for the sequence number to also be transferred when switching the external node S1, D1 from one mesh boundary node M1-M4 to another one so that temporal continuity can be maintained. Although this ensures the function according to the application example, it is only possible with extensive use of the protocol.

A further development of the invention offers a simpler solution by observing rules specific to the invention when updating the allocation tables. As a result, most temporal sequence conflicts can be avoided. In the rare case when a conflict does arise, there will be short-term disturbances in the mesh network, but they will be rectified by the routing protocol.

According to the invention, at least portions of the following rules should be followed when updating the allocation tables:

Entries in the local part of the allocation table are set and deleted only via external methods, for example by associating and dissociating an IEEE 802.11 station with a mesh access point. Only these external methods may update allocations in the local part.

If a mesh boundary node receives a routing message or an allocation message that contains an allocation for whose external node an allocation already exists in the local part of the allocation table of the mesh boundary node, this allocation will not be adopted and the existing allocation in the local part of the allocation table will not be updated. This case may occur based on temporal constellations when switching a station. But it may also be an indication of configuration problems in the network, like those that arise with duplicate MAC addresses, for example.

Allocations from routing messages, e.g., from RREQ messages with six-address support, are entered in the global part of the allocation table. If an entry already exists for the external node of the new allocation, it will be updated.

Allocation messages are considered only when they contain useful information. The allocations contained in an allocation message may not have been updated for quite some time. As a result, an allocation from an allocation message is only adopted when, for the same external node, there is no active allocation in the local part and no active allocation in the global part of the allocation table for the receiver of the allocation message. Moreover, it is essential that allocations from allocation messages:

are not able to update existing allocations in the local part of the allocation table are not able to update existing active allocations in the global part of the allocation table update inactive allocations in the global part of the allocation table, because an inactive allocation, as a rule, is older than an active one (from the allocation message). In addition, inactive allocations in the global part of the allocation table may also be deleted. If they are present, it is only as additional, historical and possibly still valid information which can be overwritten by newer information.

In order to also be able to update existing active allocations in the global part of the allocation tables by means of allocation messages, a further advantageous configuration of the allocation message also conveys the remaining validity time of the allocations along with the allocation message. For example, a simple comparison allows a decision to be made about which allocation has longer validity. This allocation is then used in the mesh node for the corresponding external node.

Based on the described specifications and definitions, the advantageous invented method will now be explained in the following for the case of an external node S1, D1 changing the mesh boundary node.

It is assumed in this description of the invented method that the source node S1 in FIG. 3 switches from the first mesh boundary node M1 to the second mesh boundary node M2. The allocation between the source node S1 and the first mesh boundary node M1 is active.

When the active allocation between the source node (station) S1 and the first mesh node M1 from the local part of the allocation table is deleted by an external process, such as, e.g., a dissociation of station S1 from the first mesh access point M1, the exited first mesh boundary node M1 sends a route error (RERR) message containing this deleted allocation by broadcast to the entire network. An RERR can be used since the allocation was a part of the path between the external source node S1 and the external destination node D1. The RERR message is expanded as compared to the standard RERR message from HWMP to the effect that it does not contain just the mesh boundary node, but rather the entire allocation, and therefore can be used advantageously for the six-address scheme used in IEEE 802.11s.

Figure 4:
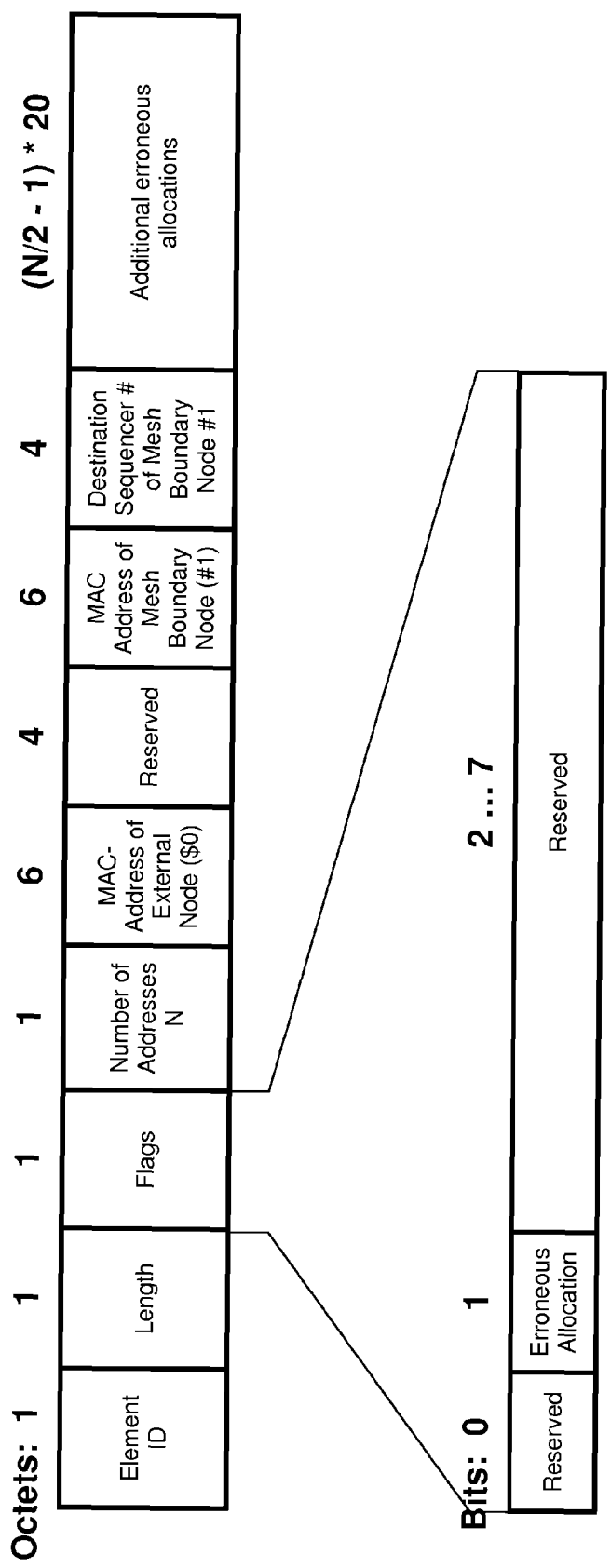
FIG. 4 Route error message expanded for six-address scheme

FIG. 4 depicts this RERR message expanded according to the invention. Note that a new flag, "Erroneous allocation," has been introduced. This flag indicates that this is an RERR for an allocation when it is set. A new field, "Number of addresses N", contains the number of the next MAC address/destination sequence number tuple. Since an allocation consists of two MAC addresses, N is always even. External nodes do not have a sequence number, because they are not part of the mesh network. In order to facilitate processing of the RERR message in the mesh node, although a corresponding field is present, it is not evaluated (entry reserved).

This field can also be omitted as needed.

Processing an RERR expanded according to the invention with an "Erroneous allocation" flag set also differs from processing the previous HWMP RERR message. The expanded RERR message may only be used on the global part of the allocation table. Only the allocations that conform to the two addresses, i.e., from mesh boundary nodes and external nodes, are deleted in the allocation table. Entries in the routing table are not deleted.

The expanded RERR message is sent again by broadcast from all mesh nodes that have a path to a mesh boundary node cited in the RERR. If several allocations are contained in the RERR, all allocations with no path to the mesh node will be deleted from the RERR prior to the re-broadcast. Alternatively, the RERR message can be sent by unicast to all neighboring nodes if they are known, for example from a list of neighbors. If the routing protocol administers precursor lists, the RERR message can also be sent by unicast only to precursor mesh nodes on the path to the mesh boundary node cited in the RERR.

After the external source node S1 (station) has moved, according to the scenario in FIG. 3, to the second mesh boundary node M2 as the new mesh node. This allocation was entered in the allocation table of the second mesh node M2, for example via the association of a station (S1) with the second mesh access point (M2), the various cases outlined in the following can occur, if the second mesh access point M2 used by the source node S1 as the new access is supposed to forward data packets from the external source node S1 to the external destination node Dl:

a) The second mesh boundary node M2 has an entry for the destination node D1 in its allocation table and a path to the associated third mesh boundary node M3 b) Although the second mesh boundary node M2 has a path to the third mesh (boundary) node M3 via which data packets must be sent to the external destination node D1, it has no entry for the external destination node D1 in its allocation table.

c) The second mesh boundary node M2 has neither an entry for the external destination node D1 in its allocation table nor a path to the corresponding third mesh boundary node M3 d) The second mesh boundary node M2 has an entry for the destination node D1 in its allocation table and no path to the associated third mesh boundary node M3

The invented method provides an advantageous solution especially for Cases b), c) and d).

In Case a), communication between the source node Si and the destination node D1 can progress immediately, because all required entries in the allocation and routing table are present. In other words, no special solution needs to be developed.

In Cases b), c) and d), the simplest solution is for the second mesh boundary node M2 to send a route request message (RREQ) with the sought-after destination address of the destination node D1, when it receives data packets from the external source node S1 for forwarding to the external destination node D1. The second mesh boundary node M2 is entered as the source address in the RREQ for the mesh source node and for the external source node S1. The destination-only flag (DO flag) is set so that only the appropriate mesh boundary node can generate a RREP. When this RREQ message is received, the third mesh boundary node M3 learns the new allocation for the source node S1 and enters it in its allocation table. It also generates a route reply message (RREP), which it sends to the second mesh boundary node M2, the mesh source node on the path between the two external nodes S1, D1. This RREP message contains the destination addresses of the third mesh boundary node M3 for the mesh destination node and D1 for the external destination node. Upon receiving this RREP message, the second mesh boundary node M2 learns the new allocation and at the same time the path to the appropriate mesh boundary node for the destination node D1 and communication between the external nodes S1, D1 can progress.

Alternatively, in Case d) a route to the corresponding mesh boundary node, i.e., to the third mesh boundary node M3, can be established by means of the RREQ: the sought-after mesh-internal destination node is the third mesh boundary node M3, the mesh source node is the second mesh boundary node M2, and the external source node is the external node S1. However, it is important that, with the existing allocation for the external destination node and the missing path to the corresponding mesh boundary node, the route request actually be initiated and that it not be considered an error situation. In the latter case, the route request would have to be initiated for the external destination node D1.

In another advantageous example of the invention, the destination-only flag (DO flag) is not set in the RREQ, so that intermediate nodes may already respond with an RREP. This would shorten the waiting time for a path to the destination node D1, particularly since the old first mesh boundary node M1 that was used as access, which has an active allocation between the destination node D1 and the third mesh node M3, is located in the case of a mobile station in the vicinity of the second mesh boundary node M2 used as the new access. The reply-and-forward flag must be set so that the RREQ is forwarded to the appropriate mesh boundary point by broadcast and it learns the new allocation of the source node S1. For this method, the HWMP processing rules for RREQs whose DO flag is not set must be expanded as follows:

If an intermediate node has an active entry in the allocation table for the sought-after node of the RREQ, it responds with an RREP for the sought-after node. For destination addresses, the corresponding values are taken from the allocation table (mesh and external destination node).

Since the second mesh boundary node M2 of an external node S1 used as the new access is often not far away from the old access, i.e., the first mesh boundary node M1, a path between external nodes S1 and D1 can be established very quickly as a result. This path runs via the old mesh boundary node. The RREQ/RREP messages will find the best path after a certain amount of time, which will then also be used.

In another advantageous configuration of the invention, the first mesh boundary node M1 previously used as access sends a special allocation message by broadcast, as depicted in FIG. 5, containing all active allocations from the global part of its allocation table, when an active allocation is deleted from the local part of the allocation table by an external process, such as, e.g., a dissociation of a station from a mesh access point. So that it is not necessary to distribute this allocation message to the entire wireless mesh network, its dissemination can be restricted by setting a corresponding time-to-live (TTL) value. The TTL value specifies the number of times the allocation message can be forwarded. Ideally, the initial TTL value should be large enough that the probable new access point, the second mesh boundary point M2, via which the external node S1 can now be reached, can also be reached by the allocation message. As a rule, this value can be less than the network diameter. Nodes enter the allocations from the allocation message in their allocation tables in accordance with the rules explained in the foregoing. The new mesh boundary node, the second mesh node M2, thus learns the allocation from the destination node D1 to the third mesh node M3, and can immediately forward data to the third mesh node M3 if it already has a path to the third mesh boundary node M3 (see aforementioned Case b)). A RREQ/RREP also does not have to be sent as described above for the general case. For the above-mentioned Cases c) and d), the allocation message does not provide an advantage, since then a path to the third mesh boundary node M3 would always still have to be sought. In this case, however, the RREQ should immediately look for the external destination node D1.

For a short duration, the old mesh boundary node M1 may receive data packets containing it as the mesh destination node that are intended for the external node S1 (external destination node). It is not able to forward them via its external interface to the external destination node S1. However, based on the mechanism described above, the first mesh boundary node M1 can have an allocation from the destination node S1 to the second mesh node M2 and a mesh path to the destination node S1 via the second mesh boundary node M2 used as the new access. In this case, the first mesh boundary node M1 sends the data packets back into the mesh network and then to the external destination node S1 via the new allocation (S1-M2).

If the first mesh boundary node M1 that was previously used as access does not have a path through the mesh network to the external destination node S1, the following possibilities are available:

Establishing a mesh path to the external destination node S1: To this end, a route request is initiated with the external node S1 as the sought-after destination node and the first mesh boundary node M1 as the mesh source node. As a result, a path is established from the first mesh boundary node M1 to the destination node S1, via which the packets that were erroneously sent to the first mesh node M1 as the mesh destination node can still be forwarded to S1 functioning as the external destination node. If the information is available, e.g., from the address allocation in the data packets, the external source node D1 can be entered in the route request as the external source node. As a result, the new access point, the second mesh boundary point M2, can learn the allocation between the third mesh boundary point M3 and the external source node D1.

Buffering the packets until a path to the external destination node S1 is established, possibly through the new mesh boundary node of the external node S1. Then the buffered data packets can be forwarded to the external destination node S1. If no path to the external destination node S1 is established, the first mesh boundary node M1 can either establish a path itself (see previous point) or discard the data packets. In the latter case the source node should be notified.

The first mesh boundary node M1 previously used as access will no longer contain any data packets for the external destination node S1 as soon as the error route message modified for allocations arrives at the third mesh boundary node M3 and the allocation between the external destination node S1 and the first mesh boundary node M1 was deleted in the third mesh boundary node M3.

After receiving the RERR message modified for allocations, the third mesh boundary node M3 no longer knows which mesh boundary node to use to reach the destination node S1, because the corresponding allocation for the external destination node S1 was deleted.

The standard solution for this problem is for the third mesh boundary node M3 to initiate a route request for the external destination node S1, if it receives data packets for the external destination node S1. This is the standard HWMP behavior. As a result, the current best path to the external destination node S1 will be found, and at the same time all affected allocations will be updated.

According to a further invention-related improvement, the third mesh boundary node M3 should set the destination-only flag in the route request for the external destination node S1 so that only the corresponding second mesh boundary node M2 used as the new access responds with the new correct allocation. This prevents mesh nodes from responding with the old erroneous allocation, if they did not (yet) receive the modified RERR message. Such a response would be possible if the destination-only flag were not set in RREQ. A technical development, which also permits the useful response of intermediate nodes to an RREQ initiated by the new mesh boundary node (described above), is that the mesh boundary node notices for a certain time whether an allocation for an external node was deleted by an RERR message modified as described in the invention. If that is the case, the destination-only flag must be set in a route request for this external node.

The invented method was described in the foregoing on the basis of a scenario using a reactive routing protocol such as HWMP. The mechanisms of the invention also follow the reactive principle—they are only executed when there is a need for them. The mechanisms of the invention can also be executed proactively, i.e., even if not absolutely necessary. A proactive variation of the invention exists if the mechanisms of the invention are also used with inactive allocations.

As the description shows, the method according to the invention offers a simple method for supporting the mobility of external nodes that send data in or through a wireless mesh network. In the process, the basis of the invented method is a reactive routing protocol for the wireless mesh network and the HWMP protocol from the IEEE 802.11s standard for the application example. A six-address scheme as in IEEE standard 802.11s is adopted for this.

It was also shown that the invention expanded the existing RERR from HWMP with a "Missing allocation" flag, which controls the interpretation of the address in the RERR as an allocation between external nodes and mesh boundary nodes, so that it is also possible to announce changes in the allocations in the wireless mesh network.

It is also shown that only a few processing rules for existing HWMP routing messages are expanded according to the invention.

Moreover, it was shown that further improvement can be achieved in that, according to the invention, a new allocation message was developed which can distribute the active allocations of the global part of the allocation table in the wireless mesh network.

It has also become evident that the invention defines rules for inserting allocations in the allocation table of a node.

A great advantage of the invention that has come to light is that it supports the mobility of external nodes with very little effect on the existing mechanisms of HWMP and with a minimum of additional overhead through the required routing messages.

Figure 6A:
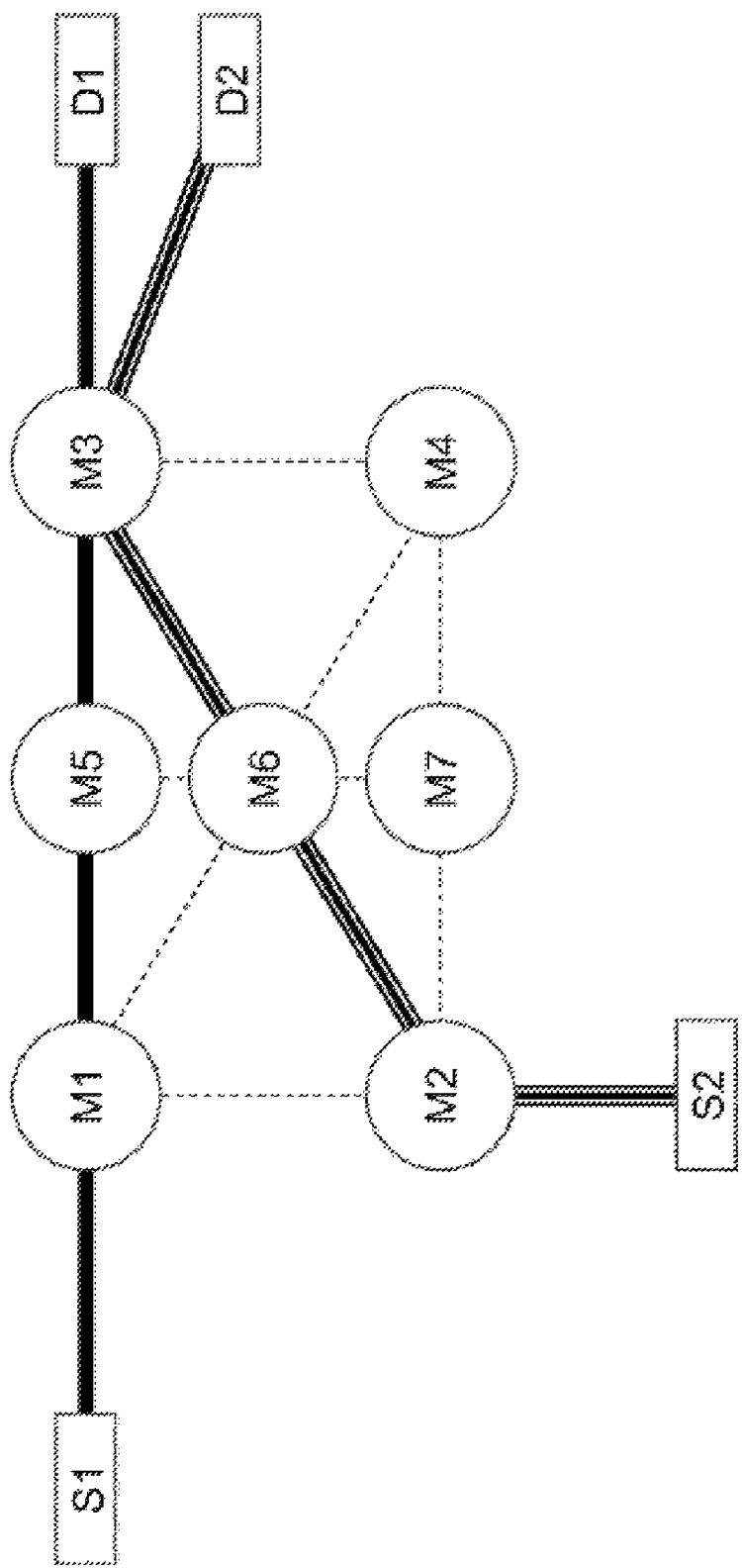
FIG. 6*a* First snapshot of the network when implementing the method according to the application example FIG. 6*b* Associated allocation tables FIG. 7*a* Second snapshot of the network when implementing the method according to the application example FIG. 7*b* Associated allocation tables FIG. 8*a* Third snapshot of the network upon conclusion of implementing the method according to the application example FIG. 8*b* Associated allocation tables FIG. 9*a* Snapshot with a variation of the application example FIG. 9*b* Associated allocation tables

Additional advantages and aspects of the invention are disclosed in the following on the basis of an additional application example, which is based on a sample network depicted in FIG. 6a.

According to this depiction, a scenario comprising the following is to be considered:

A first external source node S1, a second external source node S2, a first destination node D1, and a second destination node D2.

A first mesh boundary node M1, a second mesh boundary node M2, a third mesh boundary node M3, and a fourth mesh boundary node M4.

A first mesh intermediate node M5, a second mesh intermediate node M6, and a third mesh intermediate node M7.

According to the scenario, there are also two communication flows through the diagramed mesh network:

A first communication flow from the first external source node S1 to the first external destination node D1.

A second communication flow from the second external source node S2 to the second external destination node D2.

Figure 6B:
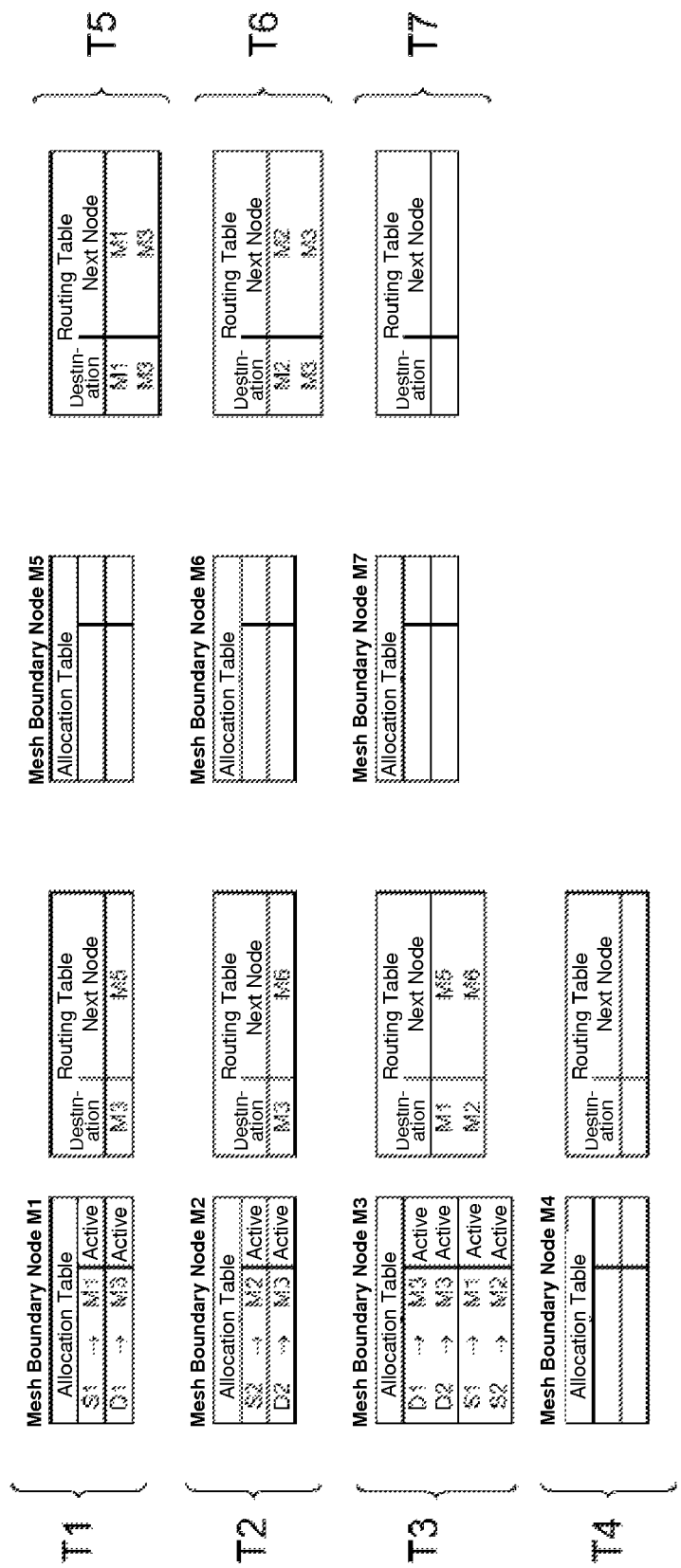

The corresponding routing tables and allocation tables produced by the scenario are depicted in FIG. 6b. They were filled with routing messages that also support the six-address scheme.

Starting from this scenario, it is assumed that the first external source node S1 moves from the first mesh boundary node M1 to the second mesh boundary node M2.

Figure 7A:
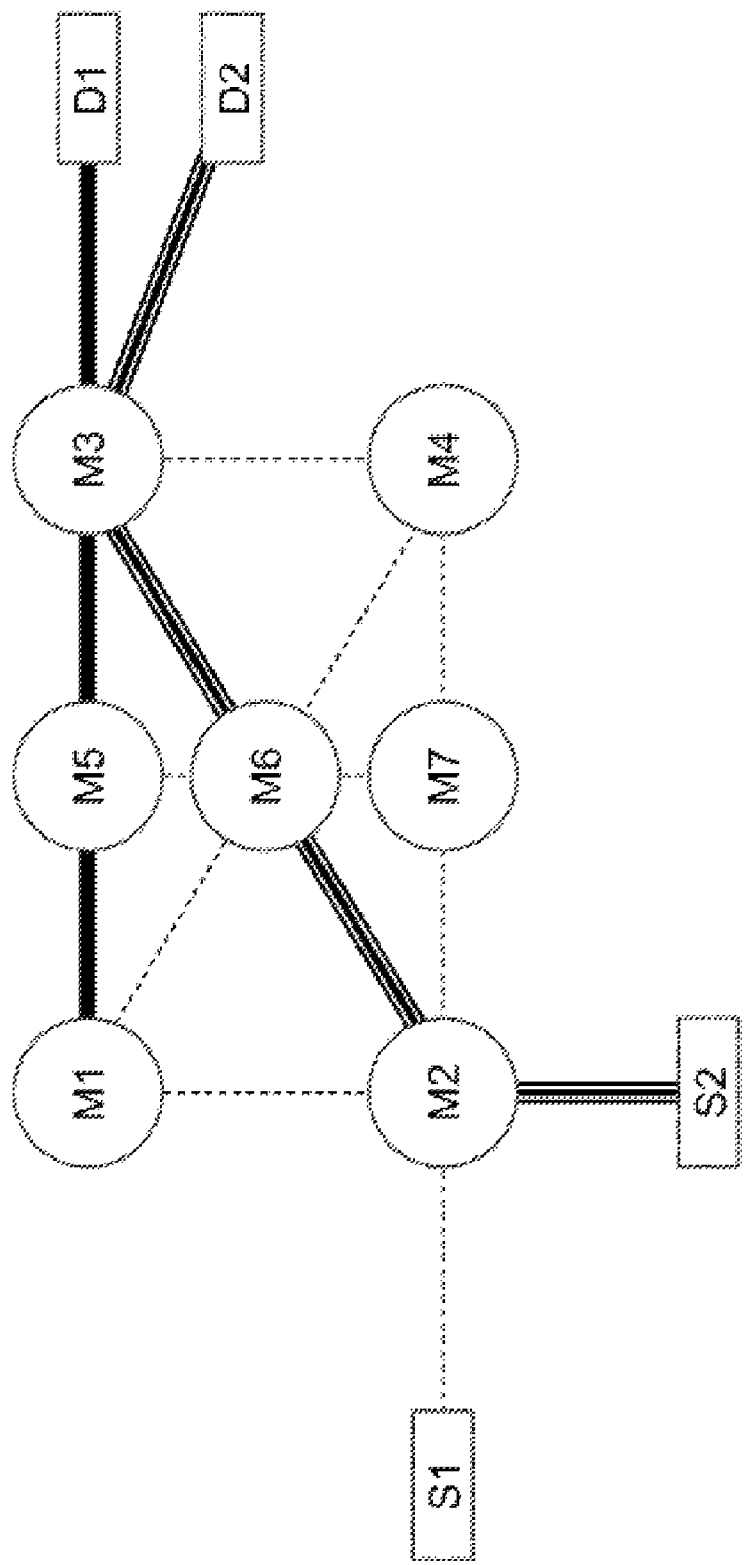
Figure 7B:
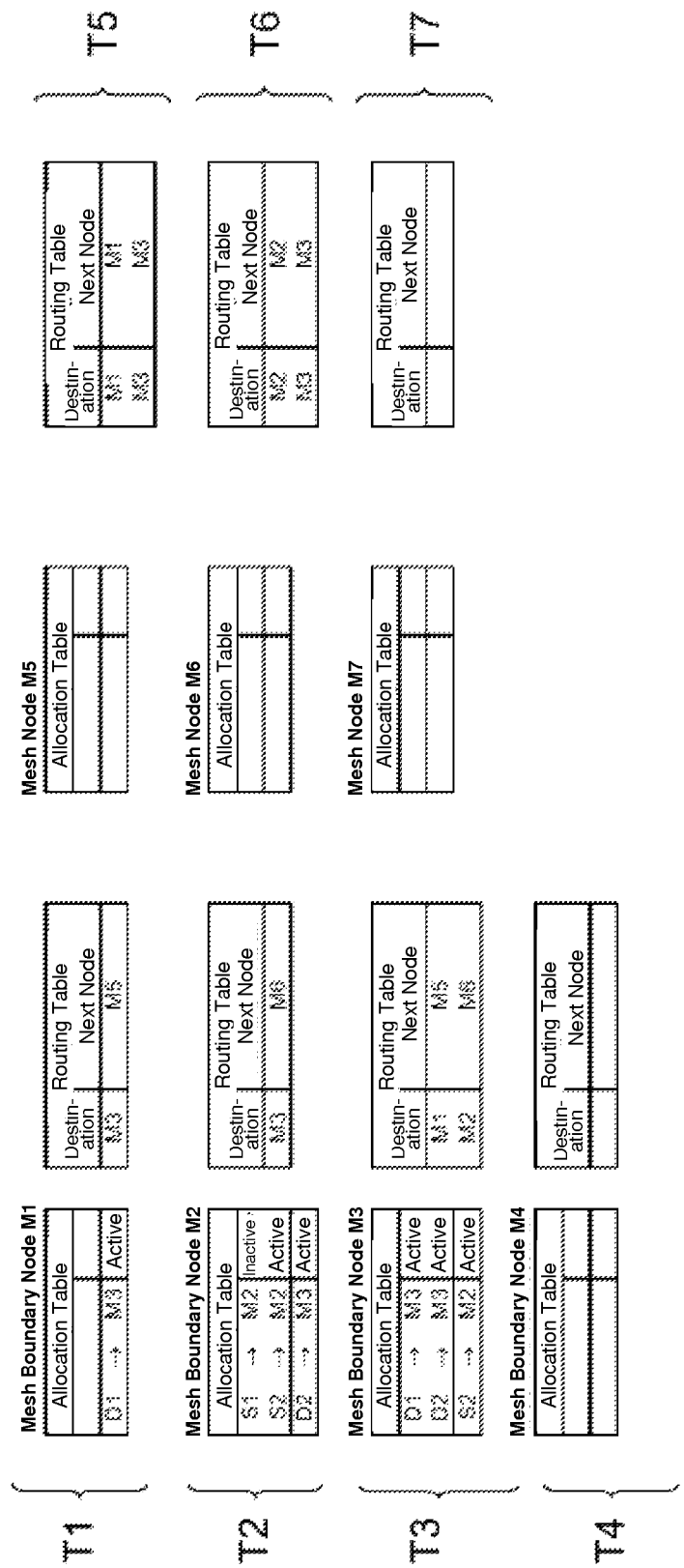

According to the application example, for this purpose the first external source node dissociates from the first mesh boundary node M1 and associates with the second mesh boundary node M2. Because the new allocation is entered in the local part of the allocation table, it is initialized as inactive. Moreover, since the old allocation between the first external source node Si and the first mesh boundary node M1 was active, a modified route error message is sent in the mesh network by the first mesh boundary node M1 in accordance with the invention. The RERR in this case contains the allocation "S1-M1". FIG. 7a shows the resulting network and FIG. 7b contains the corresponding entries in the tables of the nodes after these first actions that represent a first procedural step.

Additional procedural steps follow according to the invention, such as a second procedural step, a third procedural step, and a fourth procedural step, which to some extent run independently of one another but, depending upon the concrete points in time of the individual procedural steps, can run at the same time under some circumstances. It may also occur that, due to the current constellation in the mesh network, a step doesn't have to be executed at all. This may be the case for the fourth procedural step, although it must still be described.

Figure 8A:
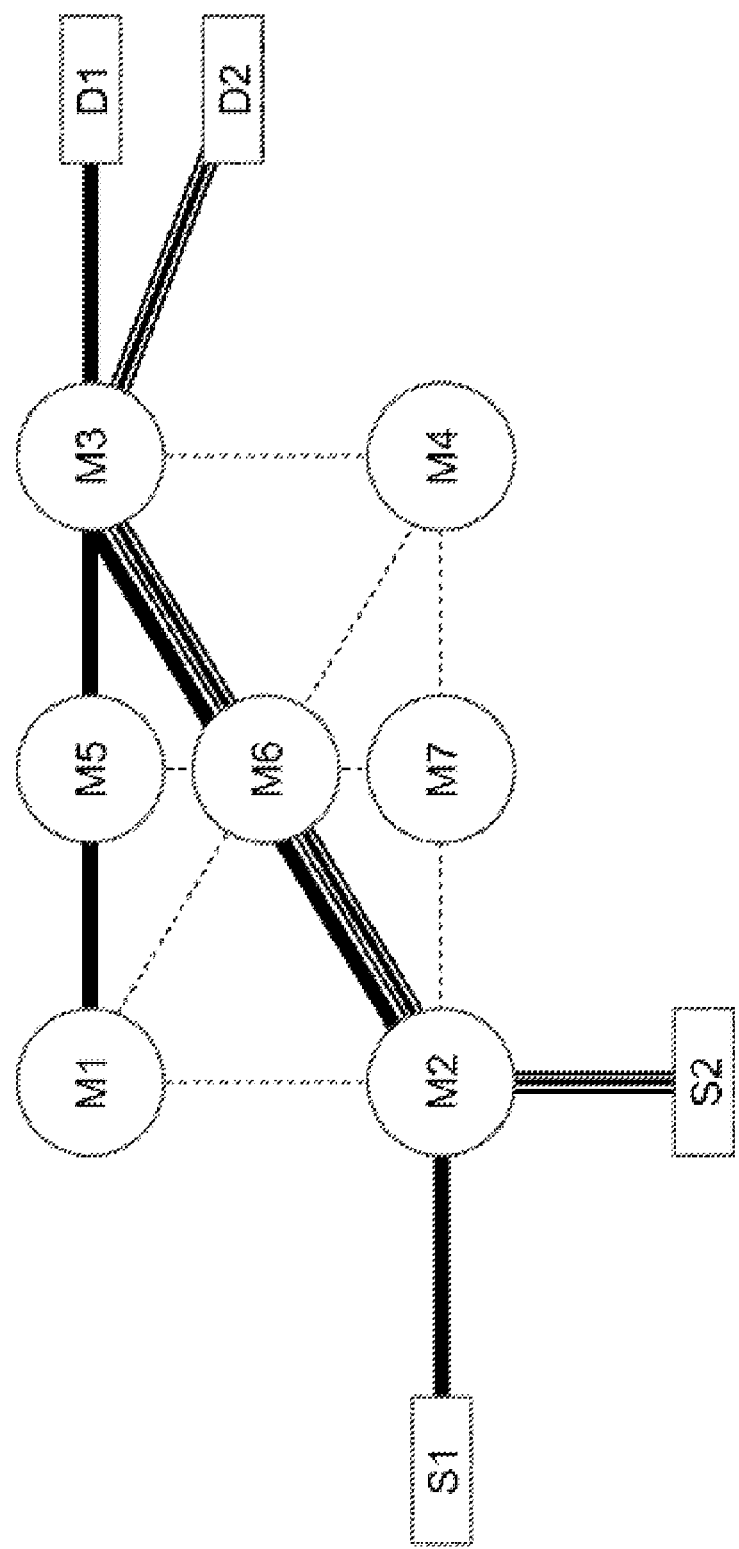
Figure 8B:
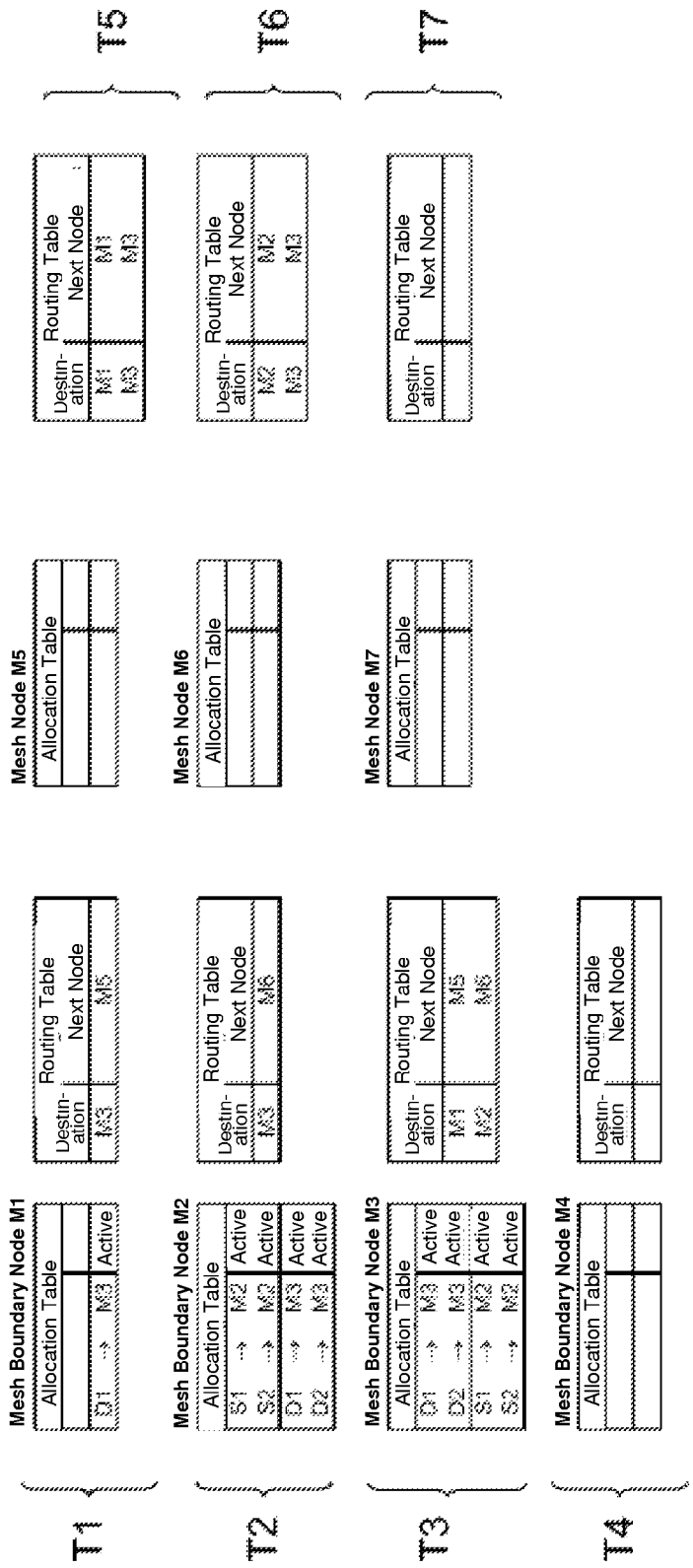

In the course of the second procedural step, the first source node S1 sends data packets to the second mesh boundary node M2, which are intended for the first external destination node D1. The allocation S1-M2 is set to active by data packets received by the first external source node S1. Since the second mesh boundary node M2 does not have an allocation for the first external destination node D1 in its allocation table, it sends a route request with the first external destination node D1 as the sought-after destination node and the first external source node S1 as the external source node and the second mesh boundary node M2 as the mesh source node. The following intermediate steps of the second procedural step are possible in this case:

1. The destination-only flag is set. The third mesh boundary node M3 receives the route request message and learns the new allocation for the external source node S1 from it. The third mesh boundary node M3 sends a route reply message with itself as mesh destination node and with the sought-after first external destination node D1 as the external destination node. When the second mesh boundary node M2 receives this route reply message, it learns the allocation for the first external destination node D1 from it. At the same time, the mesh path between mesh source node and mesh destination node is established. It already exists in this application example, so it is only updated by the RREQ/RREP. A sample network, and allocation and routing tables after the first procedural step and the first intermediate step of the second procedural step, are depicted in FIG. 8a and FIG. 8b.

2. As an alternative to the first intermediate step, the destination-only flag may also not be set. The first mesh boundary node M1 has an active allocation for the sought-after first external destination node D1 and responds with an RREP in accordance with the invention. The third mesh boundary node M3 from the allocation D1-M3 as the mesh destination node and the sought-after first external destination node D1 as the external destination node are in the RREP. The data for the mesh path to the third mesh boundary node M3 are taken from the routing table and correspondingly linked. When the second mesh boundary node M2 receives this route reply message, it learns the allocation for the first external destination node D1 from it. Because the path via the first mesh boundary node M1 previously used as the mesh access node is worse in this application example than the path already present in the second mesh boundary node M2 to the third mesh boundary node M3 of the first external destination node D1, the already existing path continues to be used. The RREQ is forwarded from the first mesh boundary node M1, corresponding to the rules of the HWMP and the invention-related supplement, and reaches the third mesh boundary node M3, which thereby learns the new allocation of the first external source node S1 to the second mesh boundary node M2. This is also possible through RREQs, which reach the third mesh boundary node M3 via other paths. The mesh boundary node M3 responds with an RREP as in the first intermediate step of the second procedural step. FIG. 8a shows the network produced in the course of the second procedural step after the first procedural step and the second intermediate step. The resulting tables and allocations are depicted in contrast in FIG. 8b.

According to the third procedural step, the first mesh boundary node M1 previously used as the access node sends an allocation message. In the process, it restricts the forwarding of this message to 2 hops (TTL=2). According to the invention, all active allocations from its allocation table are entered for this case, but according to this application example only one is entered: the allocation D1-M3. After one hop, the second mesh boundary node M2 used as the new access node receives this allocation message and enters the allocation D1-M3 contained therein in the global part of its allocation table, in accordance with the updating rules of this invention. Because the second mesh boundary node M2 already has a mesh path to the third mesh boundary node M3, the data packets for the external first destination node D1 can now be forwarded. The allocation S1-M2 is set to active in the second mesh boundary node M2 as soon as the first data packets are transmitted between the first external source node S1 and the second mesh boundary node M2. Afterwards, i.e., after execution of the first procedural step and the third procedural step, the resulting sample mesh network looks like FIG. 8a, and the allocation and tables like FIG. 8b except for one difference. The difference resulting from this, i.e., that the third procedural step cannot communicate the new allocation of the first external source node S1 to the second mesh boundary node M2 to the third mesh boundary node M3, is that the entry for the first external source node S1 in the allocation table of the third mesh boundary node M3 would be missing at this point after the first procedural step and the third procedural step.

By receiving the RERR message in accordance with the first procedural step, the third mesh boundary node M3 no longer knows an allocation for the first external source node S1. If it receives data packets for the first external source node S1 from the first external destination node D1 (bidirectional communication), it must initiate a route request based on the missing allocation for the first external source node S1. To do this, the third mesh boundary node M3 sends an RREQ in the mesh network with the first external source node S1 as the sought-after destination node and with the first external destination node D1 as the external source node and the third mesh boundary node M3 as the mesh source node. The destination-only flag is set so that only the second mesh boundary node M2 of the first external source node S1, functioning as the new access point, responds with a route reply message. When the third mesh boundary node M3 receives the RREP, it thereby learns the new allocation for the first external source node S1. At the same time, a mesh path is established between the corresponding mesh boundary nodes. Because this already exists in the application example, it is only updated. At the same time, the second mesh boundary node M2 used as the new access node also learns the allocation from the first external destination node D1 to the third mesh boundary node M3. As a result, communication between the first external source node S1 and the first external destination node D1 can continue. The allocation S1-M2 is set to active in the second mesh boundary node M2 as soon as the first data packets are transmitted between the first external source node S1 and the second mesh boundary node M2. After this step, the sample mesh network looks like FIG. 8a, and allocations and tables like the depiction in FIG. 8b.

Upon conclusion of all initiated procedural steps, communication between the two first external nodes S1, D1 will be re-established. At the end, the sample mesh network looks like FIG. 8a and FIG. 8b.

Figure 9A:
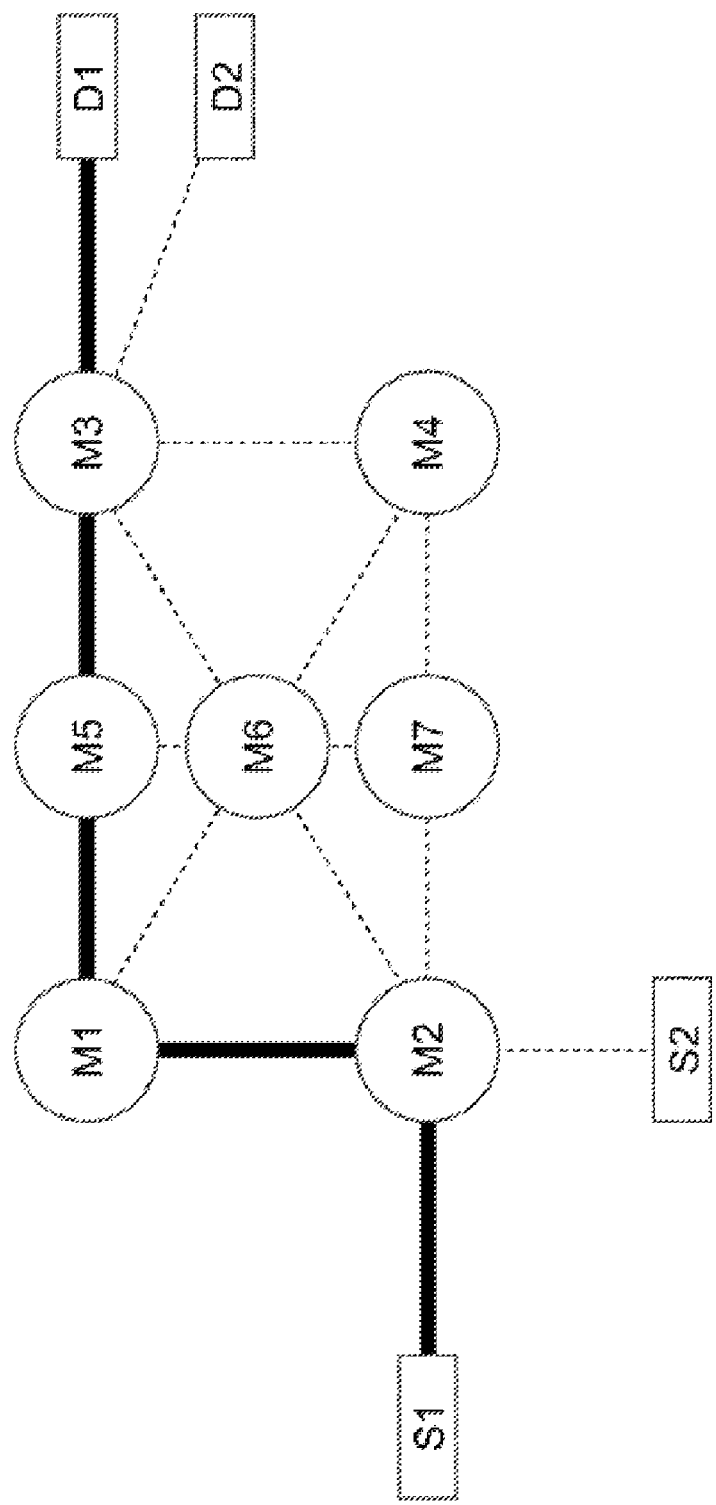

FIGS. 9a and 9b also outline a supplemental invented method that is produced with a (slight) variation of the application example previously described.

Namely, if no mesh path were to exist already between the second mesh boundary node M2 and the third mesh boundary node M3, and if the path between the second mesh boundary node M2 and the third mesh boundary node M3, which runs via the first mesh boundary node and the fifth mesh node M5, were the best of all paths between the second mesh boundary node M2 and the third mesh boundary node M3, the sample mesh network could look like the depiction in FIG. 9a, and the allocations and tables like FIG. 9b, after completion of the first procedural step and the second intermediate step of the second procedural step. The RREQ is forwarded by the first mesh boundary node M1 in accordance with the rules of HWMP and its supplementation by this invention, and reaches the third mesh boundary node M3, which thereby learns the new allocation of the first external source node S1 to the mesh boundary node M2. The mesh boundary node M3 responds with an RREP as in the first intermediate step of the second procedural step.

The invention claimed is:

1. A method for operating a mesh-type network formed by a plurality of network nodes, said network comprising at least a first network node that functions as an access point for stations which are dissociated from the network and at least a second network node that functions as a connection point for stations that are dissociated from the network, the method comprising: updating allocation information of the plurality of network nodes based on a route error message which is defined according to a routing protocol valid for the mesh network when switching a dissociated station from a radio service area of the first network node to a radio service area of the second network node in said mesh network; and
   wherein an allocation table is allocated to each of the network nodes of the mesh network, the allocation table being divided into a first subarea and a second subarea, wherein the first subarea contains at least one piece of information for all allocations of the network node of the mesh network to which the allocation table is allocated, and the second subarea contains at least one piece of information for allocations known to that network node from other network nodes of the mesh network, and at least one of the first and second subarea has an allocation characteristic which contains information reflecting an activity status;
   the second network node receiving data packets from the dissociated station for forwarding to a destination node;
   the second network node sending a route request message to obtain a destination address of the destination node;
   a third network node of the mesh network sending a route reply message in response to the route request message, the route reply message identifying the destination address;
   the third network node also updating the allocation table for the third network node with new allocation information for the dissociated station in response to receiving the route request message; and
   the second network node updating allocation information in response to the route reply message.

2. The method of claim 1 comprising, sending the route error message by means of unicast or broadcast from at least some of the network nodes of the mesh network to at least some neighboring network nodes of the mesh network, the route error message having an entire allocation for a path.

3. The method of claim 1 comprising reflecting "active" status in the activity status information of the allocation table of at least one of the network nodes of the mesh network when a data packet arrives at that at least one network node of the mesh network, the data packet signaling a dissociated node.

4. The method of claim 1 comprising structuring an allocation message on part of the first network node and sending the allocation message by means of broadcast such that the allocation message is supplemented with all allocation information identified as "active" from the second subarea of the first network node.

5. The method of claim 1, comprising, when switching the dissociated station in the case of communication attempts of the dissociated station via the mesh network, sending a route request message by the second network node and defining the route request message in accordance with a routing protocol valid for the mesh network, and manipulating the route request message in such a way that a destination-only flag is not set in the route request message.

6. The method of claim 1 wherein the destination node is a station dissociated with the mesh network.

7. The method of claim 6 further comprising the second network node learning a path to the third network node in response to receiving the route reply message from the third network node.

8. The method of claim 1 wherein a destination only flag is not set in the route request message.

9. A method for operating a mesh-type network formed by a plurality of network nodes, said network comprising at least a first network node that functions as an access point for stations which are dissociated from the network and at least a second network node that functions as a connection point for stations that are dissociated from the network, the method comprising:
   updating allocation information of the plurality of network nodes based on a route error message which is defined according to a routing protocol valid for the mesh network when switching a dissociated station from a radio service area of the first network node to a radio service area of the second network node in said mesh network; and
   sending the route error message by all mesh nodes that have a path to a mesh node functioning as a connector point and indicated in the route error message by means of broadcast, wherein all allocation information to which the sending mesh nodes do not have a path is deleted from the route error message by each of the sending mesh nodes prior to the broadcast of the route error messages by the sending mesh nodes.

10. The method of claim 9 wherein the route error message include at least one piece of information represented as an erroneous allocation flag that indicates erroneous allocation information.

11. The method of claim 9 comprising basing the route error message only on manipulations of an area of an allocation table having allocation information.

12. A method for operating a mesh-type network formed by a plurality of network nodes, said network comprising at least a first network node of the mesh network that functions as an access point for stations which are dissociated from the network and at least a second network node of the mesh network that functions as a connection point for stations that are dissociated from the network, the method comprising:
   updating allocation information of the plurality of network nodes of the mesh network based on a route error message which is defined according to a routing protocol valid for the mesh network when switching a dissociated station from a radio service area of the first network node to a radio service area of the second network node in said mesh network; and
   wherein an allocation table allocated to a network node of the mesh network is divided into a first subarea and a second subarea, the first subarea containing at least one piece of information for all allocations of the network node of the mesh network to which the allocation table is allocated and the second subarea containing at least once piece of information for allocations known to the network node of the mesh network from other network nodes of the mesh network, and at least one of the first and second subarea has an allocation characteristic structured as an allocation table which contains information reflecting an activity status; and supplementing the information about the allocations with information about a first validity period structured as a column, wherein, when setting the activity status information to a status of "active", a value of the first validity period is entered and when the first validity period expires the activity status information is set to a status of "inactive."

13. The method of claim 12 comprising determining the value of the first validity period to correlate to a validity period of a path to which the updating with respect to the involved nodes relates.

14. The method of claim 13 comprising carrying out the determination on a basis of path-forming protocol messages according to the protocol valid for the mesh network.

15. The method of claim 12 comprising updating at least the activity status information of the first subarea on a basis of events initiated by access procedures prescribed for the dissociated station.

16. The method of claim 12 comprising updating at least the activity information of the second subarea on a basis of events initiated by routing procedures prescribed for the mesh network.

17. A method for operating a mesh-type network formed by a plurality of network nodes, said network comprising at least a first network node that functions as an access point for stations which are dissociated from the network and at least a second network node that functions as a connection point for stations that are dissociated from the network, the method comprising:
updating allocation information of the plurality of network nodes based on a route error message which is defined according to a routing protocol valid for the mesh network when switching a dissociated station from a radio service area of the first network node to a radio service area of the second network node in said mesh network; and
wherein an allocation table allocated to a network node of the mesh network is divided into a first subarea and a second subarea, wherein the first subarea contains at least one piece of information for all allocations of the network node of the mesh network to which the allocation table is allocated, and the second subarea contains at least once piece of information for allocations known to the network node of the mesh network to which the allocation table is allocated from other network nodes of the mesh network, and at least one of the first and second subarea has an allocation characteristic structured as an allocation table which contains information reflecting an activity status; and
discarding received information by the network node of the mesh network that contained information about allocation information already contained in the first subarea.

18. A method for operating a mesh-type network formed by a plurality of network nodes, said network comprising at least a first network node that functions as an access point for stations which are dissociated from the network and at least a second network node that functions as a connection point for stations that are dissociated from the network, the method comprising:
updating allocation information of the plurality of network nodes based on a route error message which is defined according to a routing protocol valid for the mesh network when switching a dissociated station from a radio service area of the first network node to a radio service area of the second network node in said mesh network; and
structuring a message on part of the first network node and sending the message by means of broadcast such that the message is supplemented with all allocation information identified as "active" from a table area of the first network node; and
constituting allocation messages in accordance with the routing protocol valid for the mesh network such that the allocation messages are occupied in a targeted manner with an actual remaining validity period of the respective allocation information, for a determination of a first validity period.

19. The method of claim 18 comprising establishing a number of times the allocation message is forwarded to other nodes by a time-to-live value.

20. A method for operating a mesh-type network formed by a plurality of network nodes, said network comprising at least a first network node that functions as an access point for stations which are dissociated from the network and at least a second network node that functions as a connection point for stations that are dissociated from the network, the method comprising:
updating allocation information of the plurality of network nodes based on a route error message which is defined according to a routing protocol valid for the mesh network when switching a dissociated station from a radio service area of the first network node to a radio service area of the second network node in said mesh network; and
wherein an allocation table is allocated to each of the network nodes of the mesh network, the allocation table being divided into a first subarea and a second subarea, wherein the first subarea contains at least one piece of information for all allocations of the network node of the mesh network to which the allocation table is allocated, and the second subarea contains at least one piece of information for allocations known to that network node from other network nodes of the mesh network, and at least one of the first and second subarea has an allocation characteristic which contains information reflecting an activity status;
a third network node of the mesh network receiving data packets from a sending station to forward to the dissociated station after the route error message is sent;
the third network node sending a route request message identifying the dissociated station as a sought-after destination node, the route request message also having a destination only flag set;
the second network node sending a route reply message in response to the route request message, the route reply message containing a destination address of the dissociated station and an address of the second network node; and
the third network node learning a path to the dissociated station in response to receiving the route reply message from the second network node.

* * * * *